(12) United States Patent
Mueller et al.

(10) Patent No.: US 10,579,803 B1
(45) Date of Patent: Mar. 3, 2020

(54) SYSTEM AND METHOD FOR MANAGEMENT OF APPLICATION VULNERABILITIES

(71) Applicant: JPMorgan Chase Bank, N.A., New York, NY (US)

(72) Inventors: Georg Mueller, Grapevine, TX (US); Marianne Thomas, South Haven, MI (US)

(73) Assignee: JPMorgan Chase Bank, N.A., New York, NY (US)

( * ) Notice: Subject to any disclaimer, the term of this patent is extended or adjusted under 35 U.S.C. 154(b) by 168 days.

(21) Appl. No.: 15/816,466

(22) Filed: Nov. 17, 2017

Related U.S. Application Data

(60) Provisional application No. 62/423,551, filed on Nov. 17, 2016.

(51) Int. Cl.
*G06F 21/57* (2013.01)
*G06F 8/70* (2018.01)

(52) U.S. Cl.
CPC ............. *G06F 21/577* (2013.01); *G06F 8/70* (2013.01); *G06F 2221/033* (2013.01)

(58) Field of Classification Search
CPC combination set(s) only.
See application file for complete search history.

(56) References Cited

U.S. PATENT DOCUMENTS

| | | | | |
|---|---|---|---|---|
| 2014/0283081 | A1* | 9/2014 | Sheridan | G06F 21/577 726/25 |
| 2016/0300065 | A1* | 10/2016 | Bang | G06F 21/577 |
| 2017/0300698 | A1* | 10/2017 | Chawla | G06F 16/951 |

* cited by examiner

*Primary Examiner* — Minh Dinh
(74) *Attorney, Agent, or Firm* — Hunton Andrews Kurth LLP

(57) ABSTRACT

The invention relates to a computer-implemented system and method for management of software application issues such as software application vulnerabilities or software quality. The method may comprise the steps of receiving software vulnerability data from a plurality of vulnerability scanning systems; automatically generating a unique vulnerability ID for a vulnerability using a plurality attributes of the vulnerability; comparing a current load of vulnerability data with a previous load of vulnerability data and generating a table of deltas; grouping vulnerabilities into a group that can be managed and remediated on a group basis as a unit of work rather than individually; and automatically generating entries in the developer task tracking system for each vulnerability group or individual vulnerabilities for resolution.

18 Claims, 16 Drawing Sheets

VMS

Application Vulnerability Management Service

R575855 Logout

| Filters | | Unplanned | Plan | Remediate | Close |
|---|---|---|---|---|---|
| Current Application | | release1 | | | |
| 34556 ▼ | | | | | |

Source
☐ BlackDuck
☐ Fortify
☐ Mixed

Severity
☐ Critical
☐ High
☐ Medium
☐ Low

Jira Status
☐ Not Opened
☐ Pending
☐ Open
☐ Reopened

Group 🔲 | Ungroup 🗗

Vulnerabilities

| | Source | Name | Count | Severity | File Path | File Name | JiraId | Jira Status | Assignee | Scan Date | Indicator |
|---|---|---|---|---|---|---|---|---|---|---|---|
| ☐ | + Blackduck | Automatic_34556_P... | 1 | Medium | PMTv3141400... | spring-web... | PPLST... | Open | R575855 | 06/07/2017 | Inserted |
| ☐ | + Blackduck | Automatic_34556_P... | 1 | High | PMT-31200100... | commons-file... | PPLST... | Open | R575855 | 09/17/2015 | Inserted |
| ☐ | + Blackduck | Automatic_34556_P... | 3 | Medium | PMT-31200100... | poi-3.8-201... | | Not Opened | R575855 | 09/17/2015 | Inserted |

| | | | | | | | | | | |
|--|--|--|--|--|--|--|--|--|--|--|
| | Source | Name | Count | Severity | File Path | File Name | Jirald | Jira Status | Assignee | Scan Date | Indicator |
| □ + | Fortify | Automatic_Insecure_Rando... | 2 | Low | ssep_unpacks/vMS... | asu-supportmi... | | NotOpened | | 09/27/2017 | Inserted |
| □ + | Fortify | Automatic_SystemInformati... | 2 | Low | 88480-AVMS-VMSS... | FortifyApiImport... | | NotOpened | | 10/02/2017 | Inserted |
| □ + | Fortify | Automatic_SystemInformati... | 2 | Low | 88480-AVMS-VMSS... | JiraServiceImpl... | | NotOpened | | 09/27/2017 | Inserted |
| □ + | Fortify | Automatic_SystemInformati... | 2 | Medium | 88480-AVMS-VMSS... | JiraServiceImpl... | | NotOpened | | 10/02/2017 | Inserted |
| □ + | Fortify | Automatic_WeakCryptogra... | 2 | Medium | ssep_unpacks/vMS... | FortifyFprPaths... | | NotOpened | | 10/02/2017 | Inserted |
| ☒ | Fortify | Cross-Site Scripting | | Low | ssep_unpacks/csma... | asim.js | | NotOpened | | 09/27/2017 | Inserted |
| ☒ | Fortify | SystemInformationLeak | | Low | ssep_unpacks/csma... | SpringMvcMatSe... | | NotOpened | | 09/27/2017 | Inserted |
| ☒ | Fortify | SystemInformationLeak | | Low | 88480-AVMS-VMSS... | MvReaderUtil.java | | NotOpened | | 09/27/2017 | Inserted |
| ☒ | Fortify | Denial of Service | | Low | 88480-AVMS-VMSS... | SealWebService... | | NotOpened | | 10/02/2017 | Inserted |
| □ | Fortify | Denial of Service | | Low | 88480-AVMS-VMSS... | BlackduckSourc... | | NotOpened | | 10/02/2017 | Inserted |
| □ | Fortify | SystemInformationLeak | | Low | 88480-AVMS-VMSS... | ReleaseService... | | NotOpened | | 09/27/2017 | Inserted |
| □ | Fortify | SystemInformationLeak | | Low | 88480-AVMS-VMSS... | ReflectionUtil.java | | NotOpened | | 09/27/2017 | Inserted |
| □ | Fortify | SystemInformationLeak | | Low | 88480-AVMS-VMSS... | FortifyJsonToRa... | | NotOpened | | 09/27/2017 | Inserted |
| □ | Fortify | SystemInformationLeak | | Low | 88480-AVMS-VMSS... | JiraServiceImpl... | | NotOpened | | 09/27/2017 | Inserted |

Figure 9

Application Vulnerability Management Service

R575855 Logout

Filters

Current Application: 88480 AVMS ▼

Source:
☐ BlackDuck
☐ Fortify
☐ Mixed

Severity:
☐ Critical
☐ High
☐ Medium
☐ Low

Jira Status:
☐ Not Opened
☐ Pending
☐ Open
☐ Reopened

Indicator:
☐ Inserted
☐ Updated
☐ Deleted
☐ Mixed

[Apply] [Clear] [Persist]

Unplanned: 1.10.0 | Plan: 1.10.1 | Remediate | Close

Group name: [Manual_Low_Issues ×] [Create group] ×  ← 1000
[Group] [Ungroup]

Vulnerabilities

| | Source | Name | Count | Severity | File Path | File Name | Jirald | Jira Status | Assignee | Scan Date | Indicator |
|---|---|---|---|---|---|---|---|---|---|---|---|
| ☐ + | Fortify | Automatic_Insecure_Rand... | 2 | Low | ssep_unpacks\VMS... | asi-supportmi... | | NotOpened | | 09/27/2017 | Inserted |
| ☐ + | Fortify | Automatic_System Informati... | 2 | Low | 88480-AVMS-VMSS... | FortifyAdminpot... | | NotOpened | | 10/02/2017 | Inserted |
| ☐ + | Fortify | Automatic_System Informati... | 2 | Low | 88480-AVMS-VMSS... | JiraServiceImpl... | | NotOpened | | 09/27/2017 | Inserted |
| ☐ + | Fortify | Automatic_System Informati... | 2 | Medium | 88480-AVMS-VMSS... | JiraServiceImpl... | | NotOpened | | 10/02/2017 | Inserted |
| ☐ + | Fortify | Automatic_Weak_Cryptogra... | | Medium | 88480-AVMS-VMSS... | FortifyFprPaths... | | NotOpened | | 10/02/2017 | Inserted |
| ☑ | Fortify | Cross-Site Scripting | | Low | ssep_unpacks\VMS... | asi.minjs | | NotOpened | | 09/27/2017 | Inserted |
| ☑ | Fortify | SystemInformationLeak | | Low | ssep_unpacks\sma... | SpringMvcMailSe... | | NotOpened | | 09/27/2017 | Inserted |
| ☑ | Fortify | SystemInformationLeak | | Low | ssep_unpacks\sma... | MvReaderUtiljava | | NotOpened | | 09/27/2017 | Inserted |
| ☑ | Fortify | Denial of Service | | Low | 88480-AVMS-VMSS... | SealWebService... | | NotOpened | | 10/02/2017 | Inserted |
| ☐ | Fortify | Denial of Service | | Low | 88480-AVMS-VMSS... | BlackduckSourc... | | NotOpened | | 10/02/2017 | Inserted |
| ☐ | Fortify | SystemInformationLeak | | Low | 88480-AVMS-VMSS... | ReleaseService... | | NotOpened | | 09/27/2017 | Inserted |
| ☐ | Fortify | SystemInformationLeak | | Low | 88480-AVMS-VMSS... | ReflectionUtiljava | | NotOpened | | 09/27/2017 | Inserted |
| ☐ | Fortify | SystemInformationLeak | | Low | 88480-AVMS-VMSS... | FortifyJsonToRa... | | NotOpened | | 09/27/2017 | Inserted |

| | | Source | Name | Count | Severity | File Path | File Name | JiraId | Jira Status | Assignee | Scan Date | Indicator |
|---|---|---|---|---|---|---|---|---|---|---|---|---|
| □ | + | Fortify | Automatic_Weak Cryptogra... | 2 | Medium | 88480-AVMS-VMSS... | JiraCredInfoSer... | | NotOpened | | 09/27/2017 | Inserted |
| □ | + | Fortify | Automatic_Weak Encryption... | 2 | Medium | 88480-AVMS-VMSS... | JiraCredInfoSer... | | NotOpened | | 09/27/2017 | Inserted |
| □ | + | Fortify | Automatic_Unsafe Reflect... | 4 | Low | 88480-AVMS-VMSS... | SystemConfigur... | | NotOpened | | 09/27/2017 | Inserted |
| □ | + | Fortify | Manual system Issues... | 4 | Medium | Mixed | Mixed | | NotOpened | | 10/02/2017 | Inserted |
| □ | + | Fortify | Automatic_Weak Encryption... | 2 | Medium | 88480-AVMS-VMSS... | JiraCredInfoSer... | | NotOpened | | 10/02/2017 | Inserted |
| □ | + | Fortify | Automatic_Insecure Rando... | 2 | Low | ssp.unpacksVMS... | as-is-supportmi... | | NotOpened | | 10/02/2017 | Inserted |
| □ | + | Fortify | Automatic_Unsafe Reflectio... | 3 | Low | 88480-AVMS-VMSS... | ReflectionUtil.java | | NotOpened | | 10/02/2017 | Inserted |
| □ | + | Fortify | Manual_LowIssues | 4 | Low | Mixed | Mixed | | NotOpened | | 10/02/2017 | Inserted |
| □ | + | Fortify | Automatic_Insecure Rand... | 2 | Low | 88480-AVMS-VMSS... | as-is-supportmi... | | NotOpened | | 09/27/2017 | Inserted |
| □ | + | Fortify | Automatic_SystemInformati... | 2 | Low | 88480-AVMS-VMSS... | FortifyAppImport... | | NotOpened | | 10/02/2017 | Inserted |
| □ | + | Fortify | Automatic_SystemInformati... | 2 | Low | 88480-AVMS-VMSS... | JiraServiceImpl.j... | | NotOpened | | 09/27/2017 | Inserted |

Application Vulnerability Management Service

R575855 Logout

Filters

Current Application
88480 AVMS

Source
☐ BlackDuck
☐ Fortify
☐ Mixed

Severity
☐ Critical
☐ High
☐ Medium
☐ Low

Jira Status
☐ Not Opened
☐ Pending
☐ Open
☐ Reopened

Indicator
☐ Inserted
☐ Updated
☐ Deleted
☐ Mixed

[Apply] [Clear] [Persist]

Unplanned — 1.10.0 | Plan — 1.10.1 | Remediate | Close

Group | Ungroup
Main-Table > Manual_Low Issues ← 1200

Vulnerabilities

| | Source | Name | Count | Severity | File Path | File Name | JiraID | Jira Status | Assignee | Scan Date | Indicator |
|---|---|---|---|---|---|---|---|---|---|---|---|
| ☐ | Fortify | System Information Leak | | Low | 88480-AVMS-VMSS... | ApplianceEnv... | | | | 09/27/2017 | Inserted |
| ☐ | Fortify | Denial of Service | | Low | 88480-AVMS-VMSS... | JiraServiceImpl... | | | | 10/02/2017 | Inserted |
| ☐ | Fortify | JavaScript Hijacking | | Low | ssap_unpacks/VMSA... | text.js | | | | 10/02/2017 | Inserted |
| ☐ | Fortify | Weak XML Schema | | Low | ssap_unpacks/spring... | gaia-cloud.xsd | | | | 10/02/2017 | Inserted |

Figure 12

Application Vulnerability Management Service

R575855 Logout

Filters

Current Application
34556 ▾

Source
☐ BlackDuck
☐ Fortify
☐ Mixed

Severity
☐ Critical
☐ High
☐ Medium
☐ Low

Jira Status
☐ Not Opened
☐ Pending
☐ Open
☐ Reopened

| Unplanned | Plan | Remediate | Close |
|---|---|---|---|
| | release1 ▾ | ▾ ← 1320 | ▾ |

Group ▣  Ungroup ▣

Vulnerabilities

| | Source | Name | Count | Severity | File Path | File Name | Jirald | Jira Status | Assignee | Scan Date | Indicator |
|---|---|---|---|---|---|---|---|---|---|---|---|
| ☐ | + Blackduck | Automatic_34556_P... | 1 | Medium | PMTv3141400... | spring-web... | PPLST... | Open | R575855 | 05/07/2017 | Inserted |
| ☐ | + Blackduck | Automatic_34556_P... | 1 | High | PMT-31200100... | commons-fil... | PPLST... | Open | R575855 | 09/17/2015 | Inserted |
| ☑ | + Blackduck | Automatic_34556_P... | 3 | Medium | PMT-31200100... | poi-3.8-201... | | Not Opened | R575855 | 09/17/2015 | Inserted |

| PPL Tool / PPLSTORY-686 | | |
|---|---|---|
| 34556: Blackduck Vulnerability Defect created through VMS | | |

Agile Board | Add Drawio Diagram

Details
Type: Bug
Priority: ↑ Medium ← 1600
Affects Version/s: None
Component/s: None
Labels: None Status: OPEN
Resolution: Unresolved
Fix Version/s: None

People
Assignee: MANIDEEP
Reporter: VMS_JIRA
Votes: Vote for this issue
Watchers: Start watching this issue

Dates
Created: 1 minute ago
Updated: 1 minute ago

Agile
View on Board

Description
Application Name : Project Pipeline Deployment
Vulnerability Name : CVE-2014-3574
Vulnerability Link : https://nvd.nist.gov/vuln/detail/CVE-2014-3574
Source : Blackduck
Severity : Medium
File Name : poi-3.8-20120326.jar ← 1610
File Path : PMT-31200100.package.tar/deployments/workfiles/PMTv31200100.newcode.ear
Remediation Option : Upgrade to New/Fixed Version
Remediation Date : 2017-09-30

Application Name : Project Pipeline Deployment
Vulnerability Name : CVE-2012-0213
Vulnerability Link : https://nvd.nist.gov/vuln/detail/CVE-2012-0213
Source : Blackduck
Severity : Medium
File Name : poi-3.8-20120326.jar ← 1620
File Path : PMT-31200100.package.tar/deployments/workfiles/PMTv31200100.newcode.ear
Remediation Option : Upgrade to New/Fixed Version
Remediation Date : 2017-09-30

Application Name : Project Pipeline Deployment
Vulnerability Name : CVE-2014-3529
Vulnerability Link : https://nvd.nist.gov/vuln/detail/CVE-2014-3529
Source : Blackduck
Severity : Medium
File Name : poi-3.8-20120326.jar ← 1630
File Path : PMT-31200100.package.tar/deployments/workfiles/PMTv31200100.newcode.ear
Remediation Option : Upgrade to New/Fixed Version
Remediation Date : 2017-09-30

Figure 16

SYSTEM AND METHOD FOR MANAGEMENT OF APPLICATION VULNERABILITIES

RELATED APPLICATIONS

This application claims priority to U.S. Application No. 62/423,551, filed Nov. 17, 2016, entitled "System and Method for Management of Application Vulnerabilities," which is hereby incorporated by reference.

FIELD OF THE INVENTION

The present invention relates generally to efficiently managing issues such as software security vulnerabilities for development teams, and more particularly to an automated system and method for efficiently managing issues through regular detection and tracking of issues in a variety of systems, translating those issues into units of work, pushing the units of work into a work tracking system for the development teams, and/or tracking existing issues versus new issues.

BACKGROUND

Businesses and other organizations utilize various systems to identify and remediate issues such as security vulnerabilities in their software applications. In general, a vulnerability is a weakness in the software that allows an attacker to improperly access or manipulate the company's software or associated data to the detriment of the company. Examples of application vulnerabilities may include hard-coded passwords, cross-site scripting, SQL injection, LDAP injection, insecure server configuration, and others. Businesses may utilize a number of different application scanning systems to scan the source code of software applications, the open source software (OSS) libraries, and the WEB interface during run time. Additionally, some software applications may be tested via ethical hacking. Use of these methods and systems for application vulnerability scanning leads to the identification of vulnerabilities that are then managed by the company's development teams. Other types of issues may include software quality issues detected by a code quality scanning tool, for example.

Known scanning systems, however, have a number of drawbacks. For example, developers using known scanning systems have to go to each system after every scan to identify the changes between the current scan results and the previous scan results, and this list may have dozens, hundreds or even thousands of entries. The developers may need to plan the remediation for the new issues, may might require tracking a remediation date for every issue. The developer must also verify that the issues that dropped from the scan are truly resolved, as opposed to a situation where only a partial scan was executed. Furthermore, known scanning systems list all individual issues and do not consider the unit of work, i.e., the activity required to remediate the issue. In addition, once the issue resolutions are planned they need to be entered into the developer's backlog for resolution. These and other drawbacks and gaps exist in known systems.

SUMMARY

According to one embodiment, the invention relates to a computer-implemented system and method for issue management. The method may be executed on a specially programmed computer system comprising one or more computer processors, electronic storage devices, and networks. The method may comprise the steps of: receiving issue data from a plurality of issue scanning and tracking systems; automatically generating a unique issue ID for each issue based on a unique combination of issue attributes configurable by issue type such as, for example, vulnerability type and location/occurrence; automatically comparing a current load of issue data with a previous load of issue data and generating a list of deltas indicating whether the delta is a new issue found in the current load, the absence of an issue found in a previous load, or a modified issue; determining the actual work required to resolve the issue and grouping issues into a group that can be remediated by one activity rather than individually; and applying the changes to the set of current issues.

The invention also relates to computer-implemented system for software application issue management, and to a computer readable medium containing program instructions for executing a method for software application issue management.

Exemplary embodiments of the invention can provide a number of advantages to a company or organization that is required to monitor and remediate software application issues. For example, the system can be designed as one tool to manage all application issues. The system can automatically establish the changes across all issues from various scanning and issue tracking tools and consolidate the results in one comprehensive list. Determining the one activity that can address a number of issues and automatically grouping those issues together, and feeding that work into the developer's work queue makes it possible to continuously plan and execute issue remediation during development extremely effectively. This technology can enable software development teams to stay on top of their issues during the development cycle, rather than dealing with those issues at the tail end of the development cycle. Consolidating all issues into one consolidated list allows easy focus on the most critical issues independent of their origin. In addition, because the system is integrated with a developer's task tracking tool, it enables developers to focus on their task list rather than having to compile and integrate the output from many issue scanning and tracking systems.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

FIGS. 7 and 8 show screen shots of the application before and after a group of issues was opened to view the detailed issues within the group according to an exemplary embodiment of the invention.

FIGS. 9, 10, 11 and 12 show step-by-step screen shots of the manual grouping according to an exemplary embodiment of the invention.

FIGS. 13, 14 and 15 show an example of how to push a planned issue group to a developer task tracking system such as Jira according to an exemplary embodiment of the invention.

FIG. 16 shows the representation of the issue group that was just pushed to a developer task tracking tool such as Jira in Jira according to an exemplary embodiment of the invention.

DETAILED DESCRIPTION

Exemplary embodiments of the invention will now be described in order to illustrate various features of the invention. The embodiments described herein are not intended to be limiting as to the scope of the invention, but rather are intended to provide examples of the components, use, and operation of the invention. The following description provides a detailed example of a system and method for management of software application vulnerabilities, which is one type of issue encountered in software applications. However, the system and method can be used to manage other types of issues such as software quality issues detected by a code quality scanning tool, process control breaks, service level breaks, or other issues that introduce risks relating to the security, data quality, or efficiency of the software application.

Figure 1:
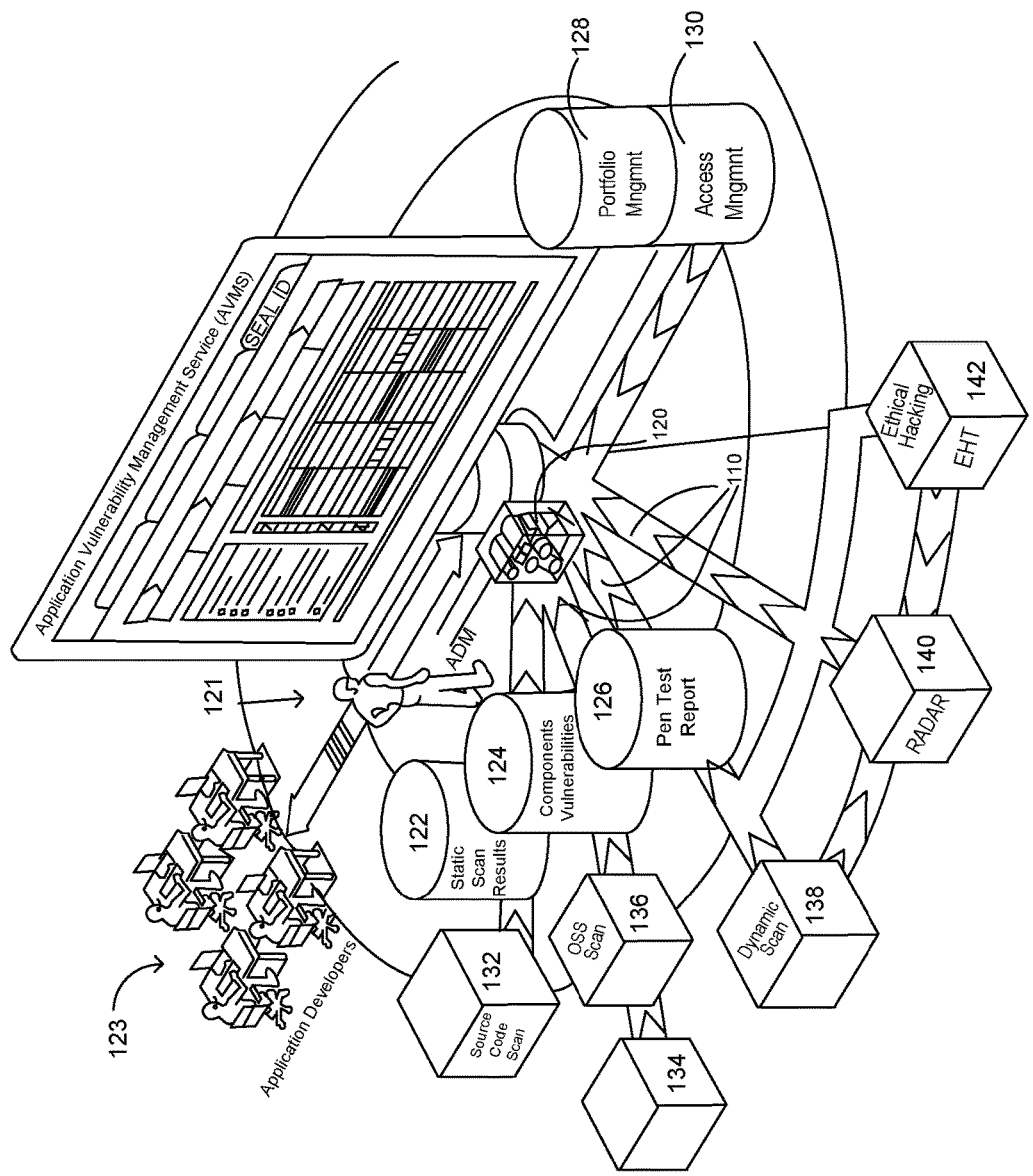
FIG. 1 is a drawing of an application issue management system according to an exemplary embodiment of the invention.

FIG. 1 is a drawing of an application vulnerability management system (AVMS) according to an exemplary embodiment of the invention. As shown in FIG. 1, the AVMS may include one or more networks and one or more computing devices, such as servers, databases, and personal computers. The AVMS may be operated by a company or other business or organization that has a need to monitor and remediate vulnerabilities in its software applications. The AVMS can streamline the vulnerability work queue for development teams, eliminating the need to identify what is new and what has changed, automatically grouping vulnerabilities into units of work (e.g., vulnerabilities in an open source library are remediated by removing or exchanging this library with a newer version, no matter how many vulnerabilities this library has at the time of scanning) and provide benefits by enabling teams to quickly prioritize vulnerabilities across different scanning complexes, minimizing the effort of remediation planning which allows the teams to spend more time on the actual vulnerability remediation during the development cycle. For simplicity, the examples set forth herein will be described in terms of a system operated by a company. However, those skilled in the art will appreciate that any type of business or organization can operate and maintain the system for its benefit.

The system can provide a number of useful functionalities for software developers, including remediation planning, defect creation, re-test initiation, closure confirmation, and false positive management. Remediation planning is simplified by determining what changed in between issue loads and pointing out the remediation planning work that needs to be completed such as assigning issues (e.g., vulnerabilities) to a release, creating defects, e.g., pushing planned issues into the developers work queue, initiating re-test for issues that require initiation of re-test, consciously closing issues that dropped off the issue load after confirming that they were actually resolved, and marking issues as Not Applicable (false positive) which feeds such information back into the system of record (e.g., a particular scanning tool) for these types of issues to avoid such a false positive to be detected in the future. Given the sensitivity and inherent risk of the "Not Applicable" management, a tool supported review and approval process can ensure that developer requests for marking issues as "Not Applicable" (i.e., false positives) are properly reviewed and approved by the appropriate experts before such issues are automatically removed from future scans.

Referring again to FIG. 1, the AVMS may be embodied primarily by a backend engine 120 owned and/or operated by a company that imports the issues (e.g., software vulnerabilities) and performs the delta and grouping into units of work. AVMS may have a user interface (UI) that is leveraged by the application development manager 121, or other members of the development team, using a personal computing device such as a desktop or laptop computer, for example, to plan the remediation of issues and push them to the development work queue. Once application issues are pushed to the developer work queue, application developers 123 who access the system via personal computing devices such as laptop or desktop computers, are able to pick up those tasks and remediate the application issue by changing application source code or application configuration files, for example. The AVMS backend process 120 may interface, directly or indirectly, with one or more other servers or computing devices, such as database servers 122, 124, 126, 128, and 130 and other servers or computers 132, 134, 136, 138 140 and 142, as shown in FIG. 1. The servers may be accessed and controlled using various personal computing devices such as desktop computers or laptop computers, for example. The application can be implemented as a client server application, as a WEB Application (SaaS), as a mobile application or in any other form that is capable of providing the desired functionality.

The servers and personal computing devices shown in FIG. 1 may be linked through various networks 110. The networks shown in FIG. 1 may comprise any one or more of the Internet, an intranet, a Local Area Network (LAN), a Wide Area Network (WAN), an Ethernet connection, a WiFi network, a Global System for Mobile Communication (GSM) link, a cellular phone network, a satellite communications network, or other network, for example. The foregoing description is merely one example of a configuration for such systems and functions and is not intended to be limiting.

As shown in FIG. 1, the AVMS may receive data that is generated using a number of systems. These systems may comprise, for example, issue scanning systems or systems of record for issues managed by the IT staff. For example, server 132 can execute a static source code scan and transmit the results to static scan database 122. The static source code scan may be executed using a known system such as Hewlett Packard's Fortify™ Static Code Analyzer or similar system, for example. The static code scan involves automatic scanning of the static (non-running) source code and identifying vulnerabilities, such as hard-coded passwords, cross-site scripting, and other vulnerabilities. This type of scan can identify insecure code by searching for specific code patterns.

The static code scan may return results in the form of a table of data, where the rows represent specific lines in the source code and the columns represent specific attributes of the vulnerability. These attributes of the source code (i.e., the columns in the table) may include, for example, a vulnerability category. The vulnerability category may be, for example, System Information Leak (internal information is not properly secured); Insecure Randomness (e.g., a function with predictable results is used as source for random numbers in a security-sensitive context); JavaScript Hijacking (e.g., a technique that an attacker can use to gain access to sensitive information, typically leveraging Ajax); Unsafe Reflection (e.g., an attacker may be able to create unintended control path flows through the application, potentially circumventing security checks); or Server-Side Request Forgery (e.g., an attack where an attacker is able to send a crafted request from a vulnerable web application to access systems the attacker would normally not have access to), for example. Additional columns may store data on other characteristics of the source code regions, such as Kingdom, which describes the defense category against the specific vulnerability. Examples of a Kingdom may include Encapsulation, Security Features, or Input Validation. Additional columns may be included in the table to specify file names, file paths, an alphanumeric identification code, and lines for identifying the specific area in the source code where the issue is located.

The AVMS may also receive data from an open source software (OSS) library scan such as Black Duck services or other OSS scanning services provided, potentially using multiple servers 134, 136. The issue data generated by and imported from Open Source Scanner may include data in a table, where the rows represent individual vulnerabilities within an open source library and the columns represent various characteristics of the vulnerability and the application context the open source library is used in. Examples of such characteristics of the application may include, for example, an application reference number, an application name, a reference date, an application risk ranking (e.g., critical, high, medium, low), while characteristics of the vulnerability may include a component ID, a component name (e.g., Apache), a component version number, a release number, a vulnerability name, a severity (e.g. low, medium, high), a CVSS score (i.e., a value determined based on the NIST Common Vulnerability Scoring System), a date of publication, remediation guidance (e.g., "Remove Component, Library or Feature," "Not an Issue" or "Upgrade to New/Fixed Version"), a planned date, a comment, a folder and a file name.

The results of the OSS scans may be transmitted to and stored in the database 124. The OSS scans can identify open source code by matching certain code characteristics with an OSS library and can detect the version of the OSS. The scan can utilize the National Vulnerability Database (NVD) maintained by the National Institute of Standards and Technology (NIST) (https://nvd.nist.gov/) to compare the scanned code with known vulnerabilities, for example. As one example, an application might use springframework-social version 1.1.2. The NVD published on Aug. 22, 2017 indicates that this library contains a cross-site request forgery (CSRF) vulnerability. The vulnerability ID is CVE-2015-5258. According to the latest version of the severity rating (version 3) the severity has been determined as HIGH. Thus, the NVD provides the list of all known vulnerabilities for a certain version of an open source library, the vulnerability type, the severity of the respective vulnerability and the date it has been registered in the NVD along with a unique vulnerability ID. The NVD provides a WEB interface that allows users to search the database manually.

FIG. 1 also shows a number of run-time scanning servers/computers 138, 140, 142 and an associated penetration test ("Pen Test") database 126 that may be used to store scanning results. The servers/computers may be used to conduct run-time or dynamic scans of the software using a system or program such as the IBM Security AppScan (computer 138), or via ethical hacking using computer 142. Vulnerability reports for dynamic scans or ethical hacking can be consolidated in another system (computer 140), for example. Dynamic scan systems such as AppScan 138 are designed to attempt to exploit the application while it is running. For example, a dynamic scan system 138 may attempt activities such as cross site scripting, SQL injection, or other types of hacking attempts in an automated fashion while the application is running. In case such attempts are successful, the system records the respective vulnerability. Ethical hacking 142 involves human attempts to find vulnerabilities similar to the dynamic scan. Humans read the application source code and attempt to find vulnerabilities by manually hacking the system. In case a vulnerability is found during ethical hacking 142, the vulnerability is entered into RADAR 140, which is one example of an issue tracking system.

The system can be connected to a portfolio management system (database 128) that may contain useful information about the software applications. In addition the system can be connected to an access management system (database 130) that allows management of roles, permissions and authentication via a single sign-on solution. If the portfolio management system 128 contains or has access to information on individuals and their roles (e.g., application owner), the system can automatically provide access for all application owners to the issues of their application and allow those individuals to manage the issues for their application. In addition access to the system and view versus plan permissions are managed via the access management system 130.

A number of advantageous features of the AVMS will now be described. According to one embodiment, the AVMS can generate a unique "issue ID" for each issue (e.g., a vulnerability or a quality issue) loaded from the issue scanning or tracking system. As described above, an issue can be identified by scanning of source code, OSS usage compared against an associated known National Vulnerability Database (NVD), a binary scan, a penetration test (both dynamic or manual) on web/app interface, etc. A unique issue ID can be generated to identify a specific issue over the life cycle across multiple issue loads in case the issue does not come with a unique ID. While some issue scanning or tracking systems will generate a unique issue ID that will be maintained over time, some issue scanning or tracking tools won't provide such an ID.

Figure 2:
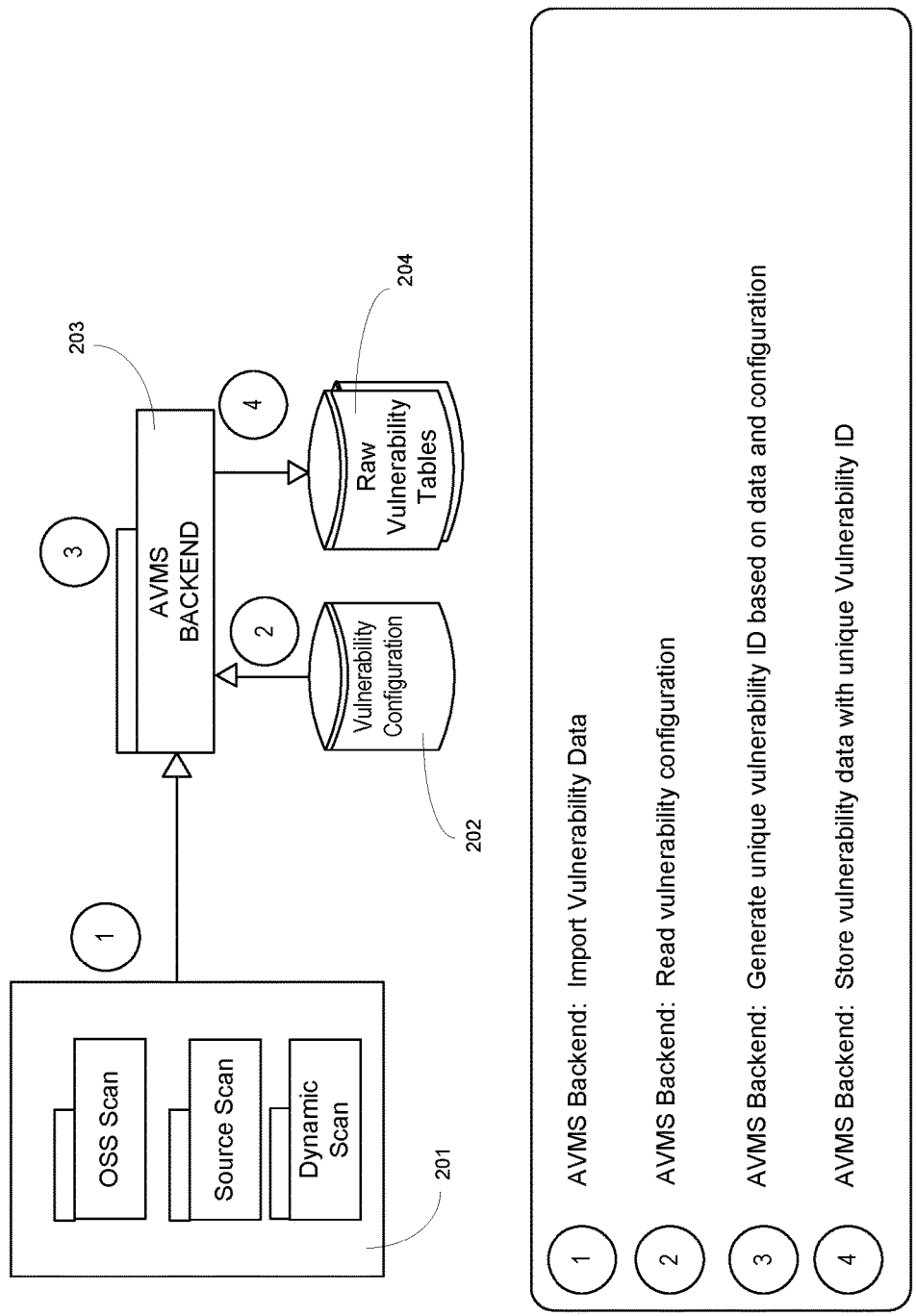
FIG. 2 illustrates a process for generating a unique issue ID according to an exemplary embodiment of the invention.

According to an exemplary embodiment of the invention, the AVMS will ensure a unique issue ID exists. The AVMS is able to generate a unique issue ID (e.g., a Vulnerability ID) by leveraging a distinct combination of data elements. FIG. 2 depicts the data flow. According to one embodiment of the invention, AVMS manages a metadata table, shown as element 202 in FIG. 2, that allows a the AVMS administrator to specify the following information for every issue scanning or tracking system that is integrated: the data elements and format of the issue information coming from the issue scanning or tracking system, and which of these data elements (one or more) constitute or make up the unique issue ID. This metadata instructs the AVMS backend 203 if issues from a specific scanning complex 201 do have a unique issue ID already (e.g., if there is only one data element making up the issue ID). In such case, this determines the data element to use as the unique ID. In case the vulnerability scanning complex 201 does not provide a unique ID, the metadata defines multiple data elements that need to be combined in order to generate this unique issue ID. As one example, an issue type, a file name and line number in the file can be used in combination in order to uniquely identify an issue. As a final step, the string of concatenated vulnerability attributes is sent through a hash algorithm in the AVMS Backend 203 to generate the unique issue ID and the resulting issue ID is stored in the raw vulnerability tables 204, which serve as the basis for delta generation and grouping of vulnerabilities. The unique Issue ID for each issue enables the AVMS to identify deltas (changes) between issue loads, which can dramatically reduce the effort to figure out what changed since the last issue load.

Another functionality that can be provided by various embodiments of the AVMS is the determination of the work required to remediate a given set of issues, which is implemented by automated grouping of issues that can be resolved via one activity. Known issue scanning and tracking systems are designed to identify and manage individual issues. However, the developers may not need to resolve each and every issue identified by such systems. For example, there may be 20 vulnerabilities found in a specific open source library. In this case, the conventional open source scanning system will show 20 individual vulnerabilities. However, in order to resolve the 20 issues the developer may be able to simply upgrade to a newer version of the open source library where all of those issues have been resolved. Hence, the unit of work is replacing the library, not individually remediating the 20 vulnerabilities. According to a preferred embodiment of the invention, AVMS automatically groups all issues that are resolved with one activity into one group. In practice, this method dramatically reduces the number of issues the developers have to track and remediate. In the context of AVMS, one unit of work is defined as the task required to remediate the related issue. The individual issues are still present as members of this group and AVMS allows inspection of those issues. But the AVMS user only needs to work on one line item (the group) instead of the individual members. All actions can be performed on this group, such as remediation planning and pushing the issue group to the developer task tracking tool for the remediation activity. Hence, a single fix results in resolving a number of issues simultaneously.

Figure 8:
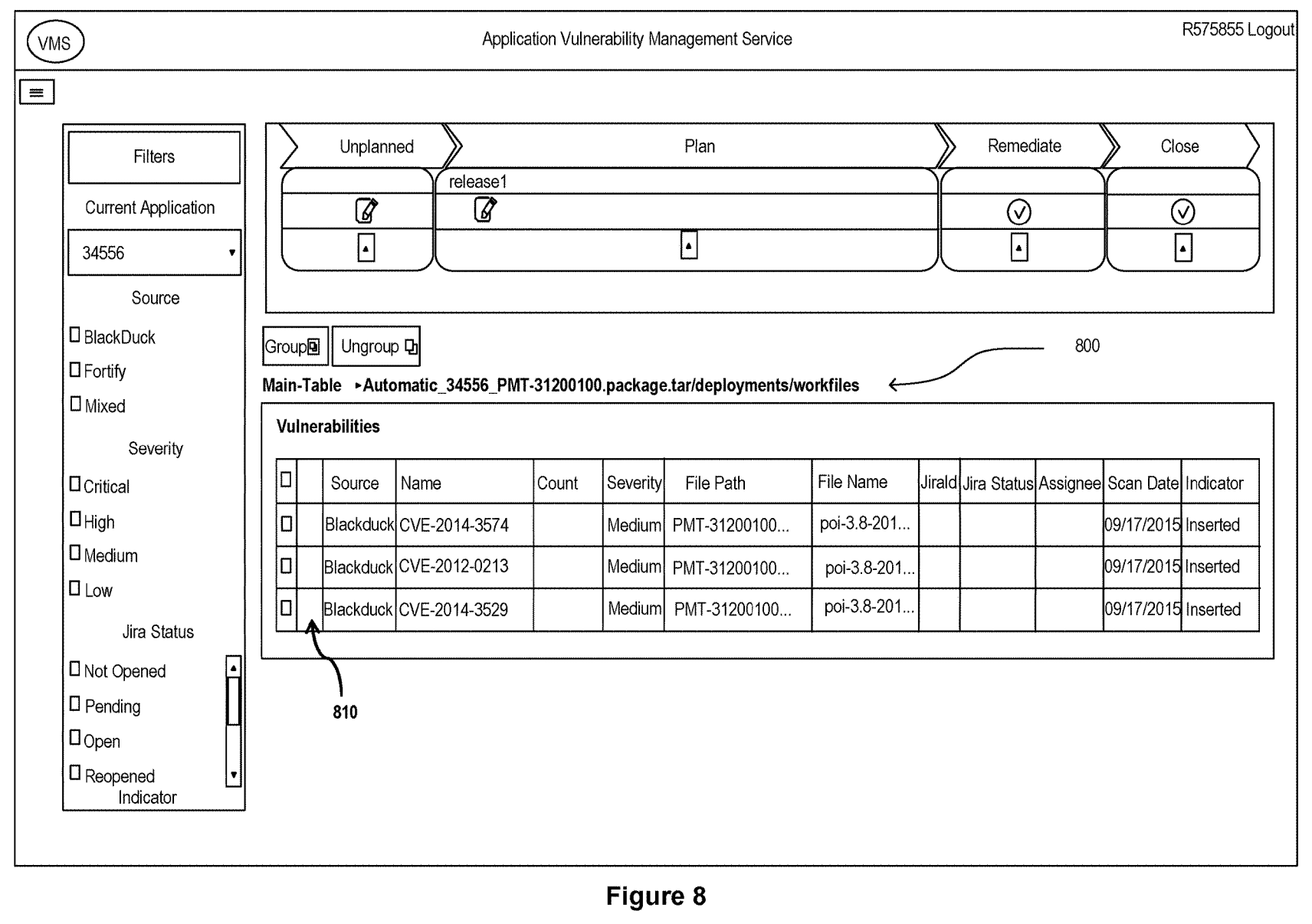

FIG. 7 illustrates an example of a user interface for the system that facilitates the grouping. FIG. 7 shows a list of three issue groups. Clicking on the "+" sign 700 for one of the issue groups will navigate to the group view shown in FIG. 8. The group navigation path is shown on top of the list 800 and the content of the group is shown in the list 810.

To allow the user to further group vulnerabilities into units of work that make sense for the developer to resolve at once, AVMS provides functionality to enable manual grouping of issues and groups of issues. The maximum level of depth is configurable. The recommended default setting for this configuration is set to 2 according to one embodiment of the invention. FIG. 9 is an example that shows a number of Fortify issues that have been selected by a user via the checkboxes 900 at the beginning of the line of each issue. The user can then press the Group button 910, which causes the group name box 1000 shown in FIG. 10 to appear, where the user can type in a group name. In this example, the user entered "Manual_Low issues" and then presses the "Create group" button to create a new group entitled "Manual_Low issues." FIG. 11 shows the resulting success message 1100 and illustrates that the new manual group 1110 has been created and is showing in the list of issues. If the user clicks the "+" sign 1120 for the manually created group, FIG. 12 shows the group navigation tree 1200 and the list below shows the four individual issues that have been grouped. The group navigation tree will allow navigating multiple level groups, in case the system is configured to allow more than 2 levels.

Figure 3:
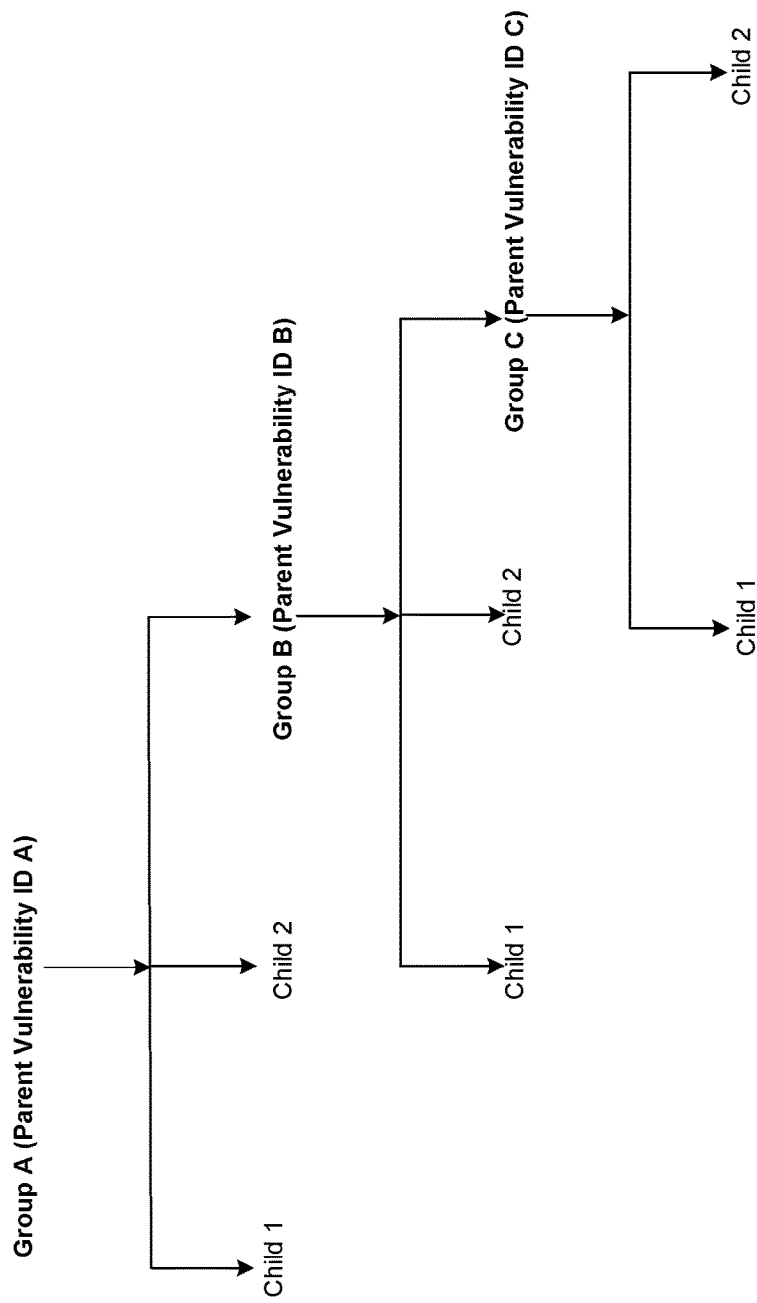
FIG. 3 is a diagram showing an example of the implementation of the grouping functionality that dramatically improves the efficiency of the issue planning process by grouping individual issues into units of work according to an exemplary embodiment of the invention.
Figure 6:
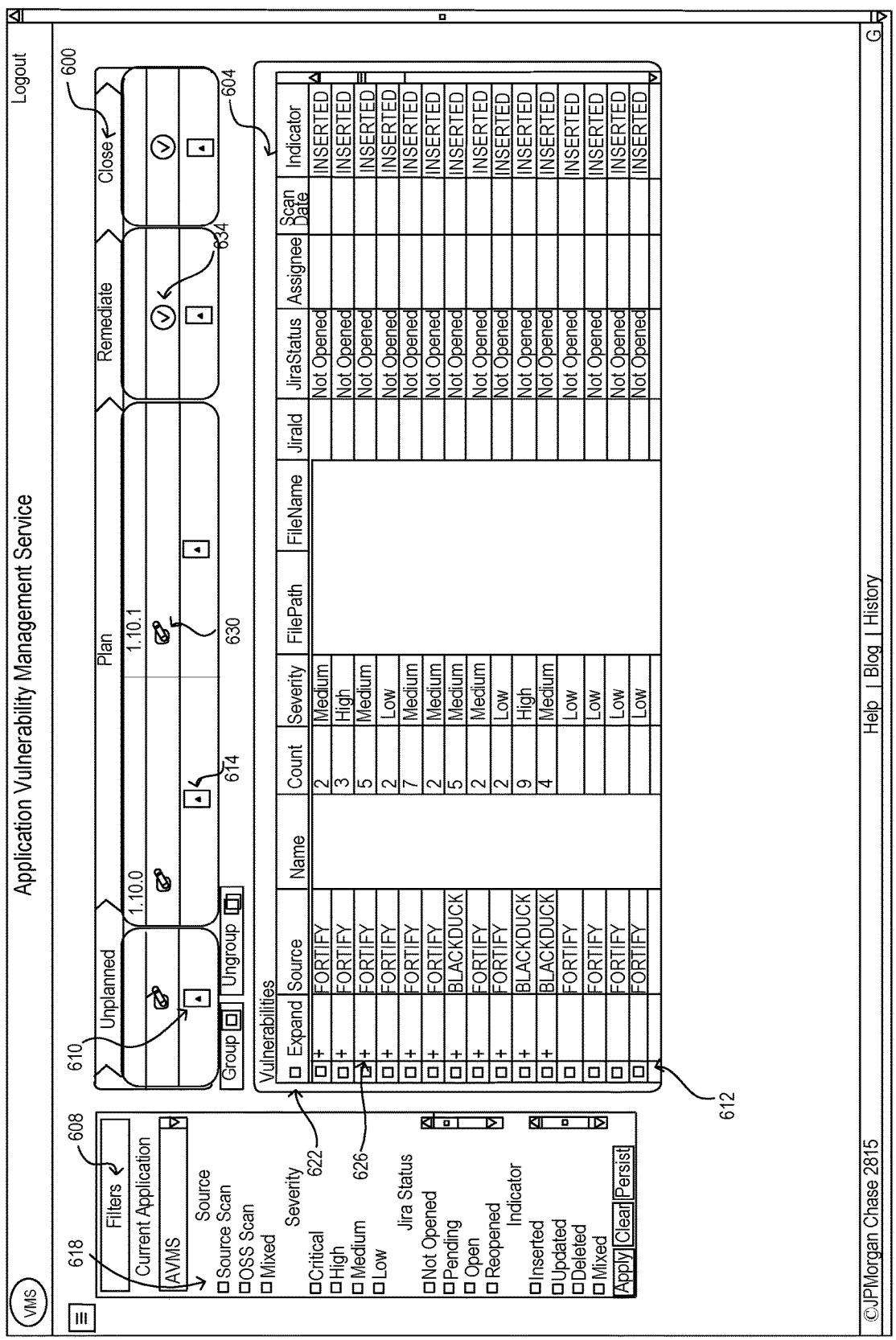
FIG. 6 is an example of a screen shot of the system that shows features that enhance the efficiency of developers according to an exemplary embodiment of the invention.

Multiple issues with a single fix, when grouped into one actionable event (unit of work) reduces the planning, tracking, and work significantly. FIG. 3 shows an example of issue grouping. Child nodes in this graph represent individual issues. There are three nested groups shown. When the system creates such a group, it performs the following steps. First, it creates a new issue entry that is marked as an issue group, copies common data elements such as library name and path for OSS vulnerabilities, determines the highest issue severity and enters that as the group's severity, and records the count of immediate child issues in the count column (e.g., as shown in FIG. 6). Second, it enters the issue ID of the newly created record into the parent ID of all children of that record. The issue list shown in the user interface will only show issues without a parent ID. According to one embodiment, automatic issue groups are not permitted to be ungrouped; only manual groups can be ungrouped.

As shown in FIG. 6, there are 11 issue groups (identified by lines that have a "+" sign in the "Expand" column). The "Count" column identifies the number of issues within that group. In this particular example there are 43 issues represented in 11 groups. In other words, there are 11 distinct activities the developers need to perform in order to remediate all 43 issues. AVMS can therefore provide significant efficiency gains by identifying, recording, and tracking the unit of work as opposed to individual issues during remediation planning in AVMS and work management in the developer work queue. In this example, the number of items to track and manage has been reduced by nearly 75%. For clarity, the Name, File Path, File Name, Assignee, and Scan Date columns in FIG. 6 have been redacted but they would normally include data entries for these cells in the table.

Another feature that can be provided by various embodiments of the AVMS is issue delta processing. Issue details normally are represented as snapshots from a specific scan date, and existing scan records do not have indicators as to whether a particular issue is a new, old, or updated issue. Existing scan records thus result in significant overhead for developers. According to one embodiment of the AVMS, in delta processing, every data load is compared against the previous load to find the delta (change) involved. For that purpose, AVMS accumulates subsequent data loads in a table referred to as the RAW table. Each data entry during such load is given a time stamp. Therefore it is possible to compare the latest and the previous data load for each issue type (e.g., static code scanning issue, open source vulnerability, etc.). Ensuring every issue has a unique ID is another key prerequisite for delta processing. As a first step, delta processing will compare the list of issues between data loads. In a second step, it will determine if any of the key attributes have changed. The key attributes are configured for each vulnerability type. Typical key issue attributes are risk ranking, severity, file path, and file name.

Figure 4:
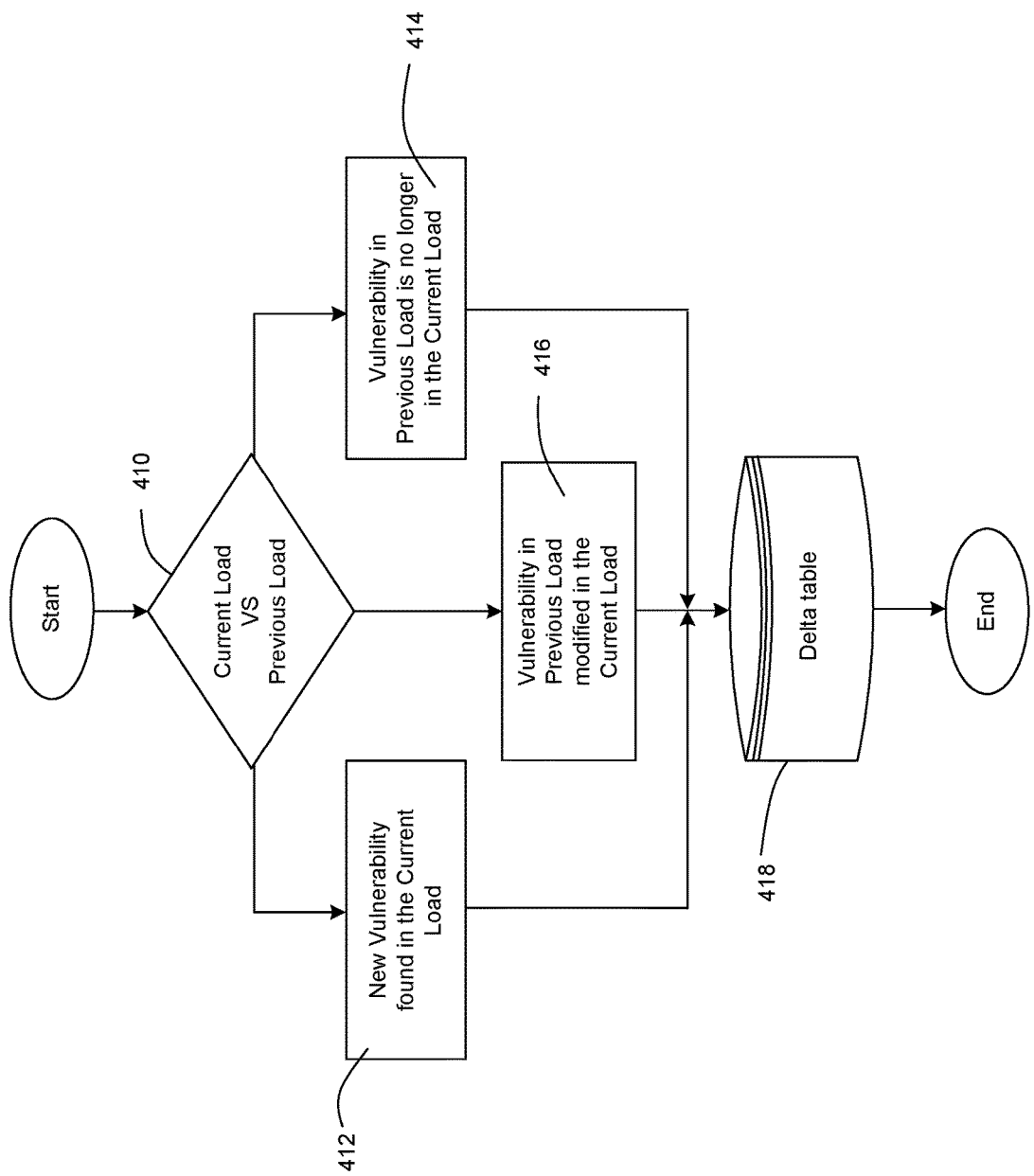
FIG. 4 is a flow chart showing a process for generating a table of deltas that indicate changes between a previous load of scan data and a current load of scan data according to an exemplary embodiment of the invention.

Referring to FIG. 4, this comparison of the current load versus the previous load in delta processing is shown as step 410. The delta can fall into any one of the following scenarios. In the first scenario, a delta can be caused by a new vulnerability that appeared in the current load which was not present in the previous load, as shown in block 412 in FIG. 4. In the second scenario, a delta can be caused by the absence of the issue which was found in the previous load, as shown in block 414. In the third scenario, a delta can be caused by the change in a set of data fields from the previous load, as shown in block 416. The delta is then stored in a delta table in the database, as shown in step 418.

An advantage that AVMS provides in tracking the deltas is that the system provides a clean work queue that avoids duplication of work, with automated updates to existing planned and unplanned issues. According to a preferred embodiment, the issue table maintained by AVMS combines all unique issues from all the different issue systems such as a static code scan system or open source code scan system. The combination of ensuring unique issue IDs in combination with the delta process between scans allows AVMS to identify if there are any necessary updates to that issue table. Such updates consist of issues that need to be added, issues where some attributes need to be updated, and issues where the status needs to change to "Deleted" because they are no longer present in the latest scan. Because the system implements the delta logic and updates the issue table, the work that has been performed with existing issues is preserved. That is, issues that have been planned and pushed into the developer work queue maintain their state (e.g., state of Open and Jira ID).

Figure 14:
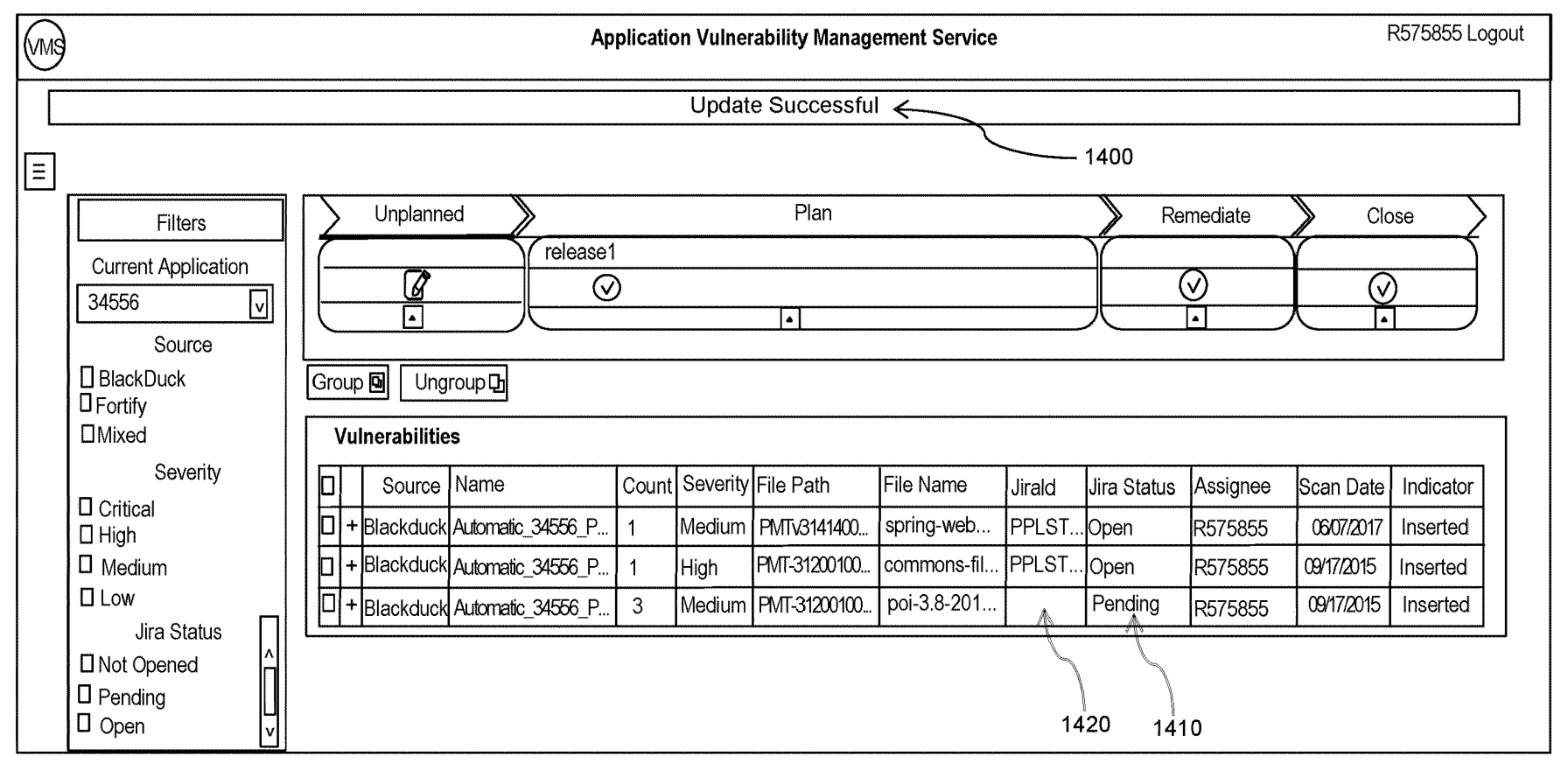
Figure 15:
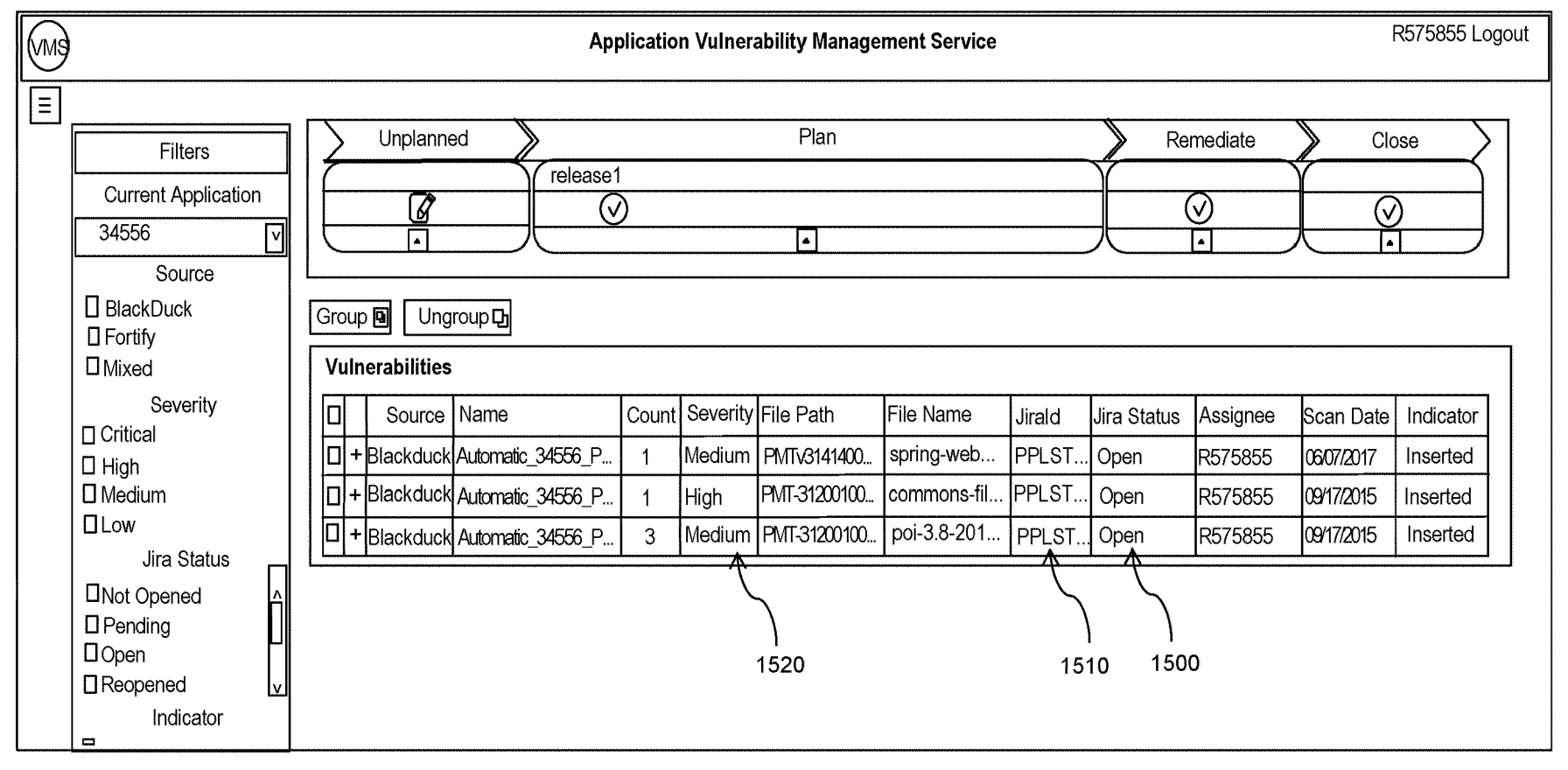

Another feature that the AVMS can provide is automatic integration with a developer task or bug tracking tool such as JIRA. AVMS is programmed to provide the capability to integrate JIRA projects and to align issue resolution with release planning and allows for pushing such planned issues into the respective release into the developer task or bug tracking tool. FIG. 13 shows a screen shot illustrating an example of the steps to push an issue group to Jira. First, the user can select one or more of the issues by checking the checkbox 1300 at the beginning of the issue line. Only issues can be pushed that have not yet been pushed to Jira (shown by status Not Opened 1310). Pressing the arrow in the Remediate step 1320 will push the selected issue(s) to Jira. FIG. 14 shows the success message 1400, and the Jira status 1410 has also changed to "Pending," but the Jira ID 1420 has not yet been received. Once pushing the issue(s) to Jira is complete, the Jira status 1500 changes to "Open," as shown in FIG. 15. As a result of creating such entry, AVMS receives back the ID 1510 of the entry created. Note that the entry that was pushed has a severity 1520 of "Medium." Such entry is effectively presented as a defect in the developer work queue. FIG. 16 shows an example of a screen shot of the resulting bug (i.e., defect) in Jira. The Priority 1600 has been set to the severity of the issue, and all three issues in the group have been pushed to Jira as one entry (1610, 1620, 1630). The Jira ID allows AVMS to automatically update such entry as needed, for example when the vulnerability content requires updating as a result of the delta process or when the vulnerability has been confirmed to be closed, which leads to AVMS closing the related task or bug in the task or bug tracking tool.

Figure 5:
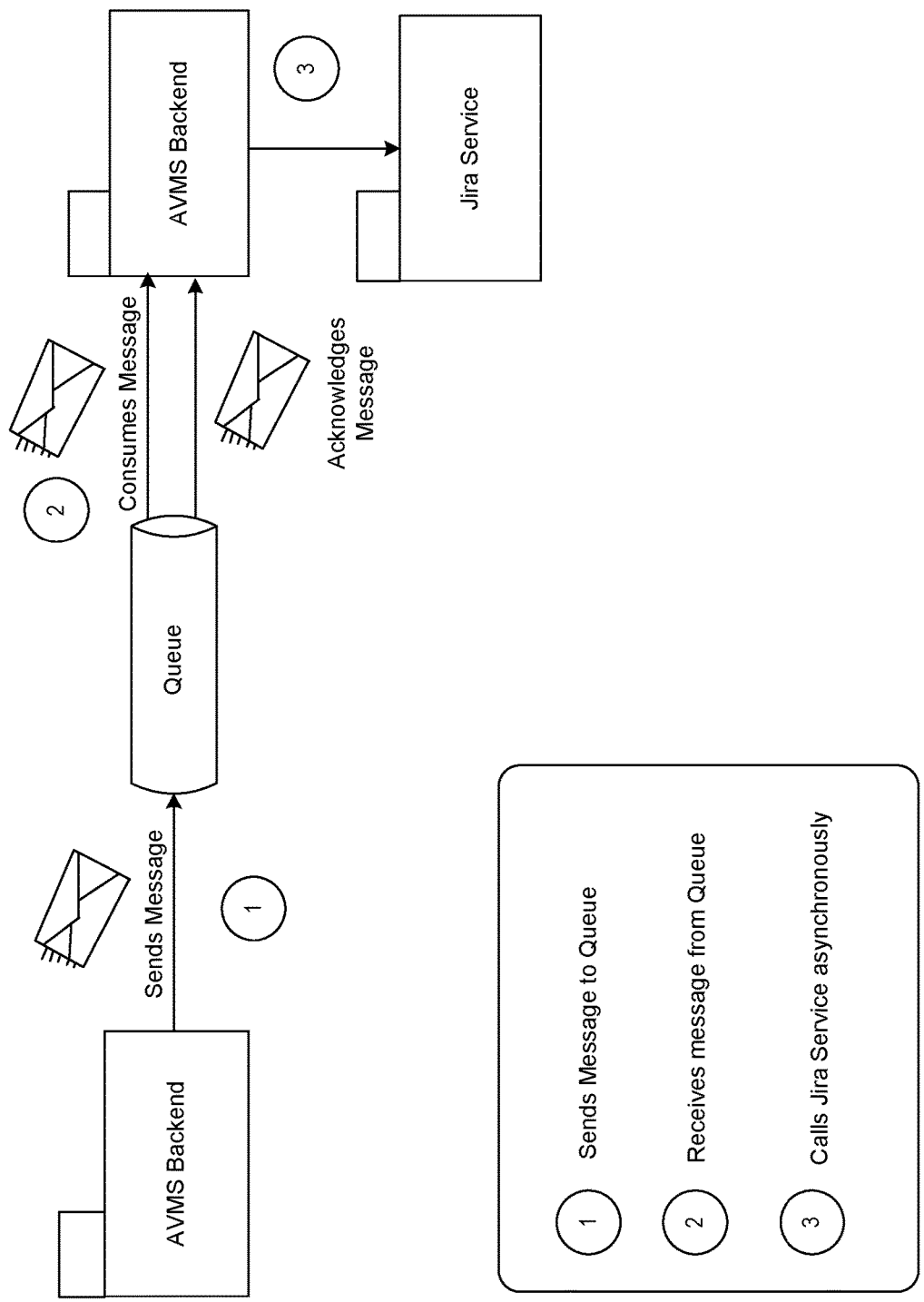
FIG. 5 is a diagram that shows an example of a process for integrating the application vulnerability management system with a developer task tracking tool according to an exemplary embodiment of the invention.

According to another embodiment of the invention, AVMS can be programmed to communicate asynchronously with the task or bug tracking service interface via message queuing. Hence, AVMS is able to solve additional architectural bottlenecks that could otherwise occur with synchronous communication, such as poor scalability and system bottlenecks. With a message queuing architecture, AVMS is able to provide increased end user productivity, better architecture flexibility and scalability. FIG. 5 is a diagram that shows the messaging between AVMS and a developer task or bug tracking tool such a JIRA according to an exemplary embodiment of the invention. As shown in FIG. 5, the AVMS backend sends a message to the queue. According to one embodiment, the message comprises a list of name value pairs (e.g., JSON format) that is submitted via a message bus (e.g., QPid). The message bus stores the message and guarantees delivery, even if the receiver is temporarily unavailable. The queue consumes the messages and sends them to the AVMS backend. The AVMS backend then calls the JIRA service asynchronously with the messages. The user receives control over the application right after the message has been sent to the message queue. The message queue ensures that the message is persisted, so it won't be lost in case of a system crash or other incidents that interrupt the processing of the application for a period of time. Hence, the message queue provides the following advantages in this embodiment: (1) the user does not have to wait for the message to be processed by the receiving application (e.g., the developer task or bug tracking tool); and (2) the message is guaranteed to be delivered, even if the target system is out of commission at the point in time of submission. The message queue will execute each message by calling the respective API of the developer task or bug tracking tool.

According to another embodiment of the invention, the AVMS can provide efficient issue planning. In known systems, issue remediation dates must be entered one by one via a cumbersome interface into a database. In the event that a release must be moved to a later date, or if a number of issues need to move to a later release, the dates have to be updated one by one. The AVMS provides an efficient way to assign vulnerabilities to releases. In case a release date changes, all the developer needs to do is update that one date. All assigned vulnerabilities are automatically updated by AVMS according to an exemplary embodiment of the invention. This functionality significantly reduces the amount of administration required for vulnerabilities where the remediation date needs to be tracked.

FIG. 6 is an illustration of a user interface provided by AVMS according to an exemplary embodiment of the invention. Assigning issues to a release is as simple as clicking the arrow 610 to display the list of unplanned issues, selecting the checkboxes to the left of all the issues that need to get assigned, and clicking the arrow 614 below the respective release. As a result, those issues will drop from the unplanned list and will be moved to the respective release. The filters 618 to the left allow for filtering the list to the desired content. The checkbox 622 in the header allows a user to check the checkboxes for the complete (filtered) list all at once. The "plus" sign 626 in the "Expand" column allows the user to expand the issues group and view the individual issues within the group. The icon of notepad and pen 630 indicates that there is work to be done (e.g., plan remediation date for vulnerability, or push vulnerability to task tracking system). The check mark icon 634 indicates that no work needs to be done for this phase. These icons are used across the application to indicate required actions (notepad) or that no work is pending (checkmark). This allows for quick visual navigation to the areas where work is pending. For clarity, the content of the columns "Name," "FilePath," "FileName," "JiraID," "Assignee," and "Scan Date" have been grayed out on purpose. They would show the issue name, the file path where the issue is located, the file name of the file that contains the issue, the JiraID, the assignee for the issue, and the date of the scan.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

Data and information maintained by the servers shown by FIG. 1 may be stored and cataloged in one or more databases, which may comprise or interface with a searchable database and/or a cloud database. The databases may comprise, include or interface to a relational database. Other databases, such as a query format database, a Standard Query Language (SQL) format database, a storage area network (SAN), or another similar data storage device, query format, platform or resource may be used. The databases may comprise a single database or a collection of databases. In some embodiments, the databases may comprise a file management system, program or application for storing and maintaining data and information used or generated by the various features and functions of the systems and methods described herein.

The communications networks used with the AVMS may be comprised of, or may interface to any one or more of the Internet, an intranet, a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network, for example.

The communications networks used with the AVMS may also comprise, include or interface to any one or more of a Wireless Application Protocol (WAP) link, a Wi-Fi link, a microwave link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based radio frequency link. The communications networks may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

In some embodiments, the communication networks may comprise a satellite communications network, such as a direct broadcast communication system (DBS) having the requisite number of dishes, satellites and transmitter/receiver boxes, for example. The communications network may also comprise a telephone communications network, such as the Public Switched Telephone Network (PSTN). In another embodiment, communication network 110 may comprise a Personal Branch Exchange (PBX), which may further connect to the PSTN.

Although examples of servers and personal computing devices are shown in FIG. 1, exemplary embodiments of the invention may utilize other types of communication devices whereby a user may interact with a network that transmits and delivers data and information used by the various systems and methods described herein. The personal computing devices may include desktop computers, laptop computers, tablet computers, smart phones, and other mobile computing devices, for example. The servers, databases, and personal computing devices may include a microprocessor, a microcontroller or other device operating under programmed control. These devices may further include an electronic memory such as a random access memory (RAM), electronically programmable read only memory (EPROM), other computer chip-based memory, a hard drive, or other magnetic, electrical, optical or other media, and other associated components connected over an electronic bus, as will be appreciated by persons skilled in the art. The mobile devices and personal computing devices may be equipped with an integral or connectable liquid crystal display (LCD), electroluminescent display, a light emitting diode (LED), organic light emitting diode (OLED) or another display screen, panel or device for viewing and manipulating files, data and other resources, for instance using a graphical user interface (GUI) or a command line interface (CLI). The mobile devices and personal computing devices may also include a network-enabled appliance or another TCP/IP client or other device. The personal computing devices may include various connections such as a cell phone connection, WiFi connection, Bluetooth connection, satellite network connection, and/or near field communication (NFC) connection, for example.

As described above, FIG. 1 shows a number of servers, databases, and personal computing devices, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software. The modules described above may comprise software, firmware, hardware, or a combination of the foregoing.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers, databases, and personal computing devices in FIG. 1 may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, and/or JavaScript. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

In the system and method of exemplary embodiments of the invention, a variety of "user interfaces" may be utilized to allow a user to interface with the personal computing devices. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. An application vulnerability management system comprising:
 a memory; and
 a computer processor that is programmed to:
  receive via a network software vulnerability data from a plurality of vulnerability scanning systems, wherein the software vulnerability data identifies a plurality of software vulnerabilities in a software application;
  automatically generate and store in the memory a unique vulnerability ID for a software vulnerability in the software application, using a plurality attributes of the software vulnerability;
  automatically compare a current load of software vulnerability data with a previous load of software vulnerability data using the computer processor and the unique vulnerability ID and automatically generate and store a table of deltas in the memory;
  group a plurality of software vulnerabilities into a group that can be remediated by performing a unit of work on a group basis rather than individually remediating each software vulnerability;
  generate a consolidated view of the plurality of software vulnerabilities, based in part on the table of deltas, and present the consolidated view to a user through a user interface, wherein the consolidated view identifies one or more groups of software vulnerabilities;
  enable the user, through the user interface, to select one or more of the groups of software vulnerabilities for association with a future release of the software application; and
  transmit via the network the selected one or more groups of software vulnerabilities to a developer task tracking tool for remediation prior to release, such that a group of software vulnerabilities can be remediated on a group basis rather than individually.

2. The system of claim 1, wherein the user interface is also designed to allow the user to select individual software vulnerabilities for association with a future release of the software application.

3. The system of claim 1, wherein the computer processor is programmed to store in table of deltas an indication of whether the delta is a new software vulnerability found in the current load, the absence of a software vulnerability found in a previous load, or a modified software vulnerability.

4. The system of claim 1, wherein the computer processor is programmed to generate the vulnerability ID using a vulnerability type, a file name, a line number and a hash algorithm.

5. The system of claim 1, wherein the computer processor is programmed to:
enable a user, via the user interface, to review software vulnerabilities that dropped from a previous load of software vulnerability data, and to mark them as closed; and
automatically trigger an action to close a corresponding entry in the developer task tracking tool.

6. The system of claim 1, wherein the computer processor is programmed to:
enable a user, with the user interface, to declare a group of software vulnerabilities or an individual vulnerability as a false positive, and to enter a justification; and
automatically initiate a review and approval workflow using the developer task tracking tool.

7. The system of claim 1, wherein the computer processor is programmed to transmit via the network the selected one or more groups of software vulnerabilities to the developer task tracking tool for remediation using message queuing to communicate asynchronously with the developer task tracking tool.

8. The system of claim 1, wherein the computer processor is programmed to enable a user, via a user interface, to select individual software vulnerabilities for inclusion in the group of software vulnerabilities.

9. The system of claim 1, wherein the computer processor is programmed to receive software vulnerability data that further identifies software vulnerability categories and software vulnerability locations for the software vulnerabilities.

10. A computer-implemented method for software vulnerability management, the method comprising:
receiving via a network software vulnerability data from a plurality of vulnerability scanning systems, wherein the software vulnerability data identifies a plurality of software vulnerabilities in a software application;
automatically generating and storing in a database a unique vulnerability ID for a software vulnerability in the software application, using a plurality attributes of the software vulnerability;
automatically comparing a current load of software vulnerability data with a previous load of software vulnerability data using a computer processor and the unique vulnerability ID and generating and storing a table of deltas in the database;
grouping a plurality of software vulnerabilities into a group that can be remediated by performing a unit of work on a group basis rather than individually remediating each software vulnerability;
generating a consolidated view of the plurality of software vulnerabilities, based in part on the table of deltas, and presenting the consolidated view to a user through a user interface, wherein the consolidated view identifies one or more groups of software vulnerabilities;
enabling the user, through the user interface, to select one or more of the groups of software vulnerabilities for association with a future release of the software application; and
transmitting via the network the selected one or more groups of software vulnerabilities to a developer task tracking tool for remediation prior to release, such that a group of software vulnerabilities can be remediated on a group basis rather than individually.

11. The method of claim 10, wherein the user interface also allows the user to select individual software vulnerabilities for association with a future release of the software application.

12. The method of claim 10, wherein the table of deltas indicates whether the delta is a new software vulnerability found in the current load, the absence of a software vulnerability found in a previous load, or a modified software vulnerability.

13. The method of claim 10, wherein the vulnerability ID is generated using a vulnerability type, a file name, a line number and a hash algorithm.

14. The method of claim 10, further comprising:
enabling a user, with the user interface, to review software vulnerabilities that dropped from a previous load of software vulnerability data, and to mark them as closed; and
automatically triggering an action to close a corresponding entry in the developer task tracking tool.

15. The method of claim 10, further comprising:
enabling a user, with the user interface, to declare a group of software vulnerabilities or an individual vulnerability as a false positive, and to enter a justification; and
automatically initiating a review and approval workflow using the developer task tracking tool.

16. The method of claim 10, wherein the step of transmitting via the network the selected one or more groups of software vulnerabilities to the developer task tracking tool for remediation comprises using message queuing to communicate asynchronously with the developer task tracking tool.

17. The method of claim 10, wherein the step of grouping a plurality of software vulnerabilities into a group comprises enabling a user, via a user interface, to select individual software vulnerabilities for inclusion in the group.

18. The method of claim 10, wherein the software vulnerability data further identifies software vulnerability categories and software vulnerability locations for the software vulnerabilities.

* * * * *